(12) United States Patent
Umbreit (10) Patent No.: US 7,689,913 B2
(45) Date of Patent: Mar. 30, 2010

(54) MANAGING INTERNET PORNOGRAPHY EFFECTIVELY

(75) Inventor: Timothy F. Umbreit, Valencia, CA (US)

(73) Assignee: US Tax Relief, LLC, Los Angeles, CA (US)

( * ) Notice: Subject to any disclaimer, the term of this patent is extended or adjusted under 35 U.S.C. 154(b) by 1156 days.

(21) Appl. No.: 11/285,268

(22) Filed: Nov. 22, 2005

(65) Prior Publication Data

US 2006/0277462 A1 Dec. 7, 2006

Related U.S. Application Data

(60) Provisional application No. 60/686,928, filed on Jun. 2, 2005.

(51) Int. Cl.
 *G06F 17/00* (2006.01)
(52) U.S. Cl. ....................... 715/271; 715/208
(58) Field of Classification Search ................. 715/234, 715/255, 271, 208, 225; 709/229; 706/20
 See application file for complete search history.

(56) References Cited

U.S. PATENT DOCUMENTS

| | | | |
|---|---|---|---|
| 5,271,007 A * | 12/1993 | Kurahashi et al. ............ 370/351 |
| 5,706,507 A * | 1/1998 | Schloss .................... 707/104.1 |
| 5,884,033 A * | 3/1999 | Duvall et al. ................ 709/206 |
| 5,933,600 A * | 8/1999 | Shieh et al. ................. 709/219 |
| 5,987,611 A * | 11/1999 | Freund .......................... 726/4 |
| 5,996,011 A * | 11/1999 | Humes ....................... 709/225 |
| 6,011,537 A * | 1/2000 | Slotznick .................... 715/733 |
| 6,389,472 B1 * | 5/2002 | Hughes et al. .............. 709/229 |
| 6,523,120 B1 * | 2/2003 | Strasnick ....................... 726/4 |
| 6,976,070 B1 * | 12/2005 | Hoashi et al. .............. 709/224 |
| 7,325,058 B1 * | 1/2008 | Sheth et al. ................. 709/225 |
| 7,444,403 B1 * | 10/2008 | Packer et al. ............... 709/224 |
| 2002/0015042 A1 * | 2/2002 | Robotham et al. .......... 345/581 |
| 2002/0026521 A1 * | 2/2002 | Sharfman et al. ........... 709/231 |
| 2003/0009495 A1 * | 1/2003 | Adjaoute ................. 707/501.1 |
| 2003/0093689 A1 * | 5/2003 | Elzam et al. ................ 713/201 |
| 2003/0121035 A1 * | 6/2003 | Ro ............................... 725/28 |
| 2003/0163731 A1 * | 8/2003 | Wigley et al. ............... 713/201 |
| 2003/0172374 A1 * | 9/2003 | Vinson et al. .................. 725/9 |
| 2003/0222902 A1 * | 12/2003 | Chupin et al. ............... 345/738 |
| 2004/0012613 A1 * | 1/2004 | Rast ........................... 345/632 |
| 2004/0039662 A1 | 2/2004 | Piccionelli et al. |
| 2004/0139053 A1 * | 7/2004 | Haunschild ..................... 707/1 |
| 2004/0158429 A1 * | 8/2004 | Bary et al. .................. 702/183 |
| 2005/0080898 A1 * | 4/2005 | Block ......................... 709/225 |

(Continued)

OTHER PUBLICATIONS

Hunter, Christopher D., "Internet Filter Effectiveness (Student Paper Panel): Testing Over and Underinclusive Blocking Decisions of Four Popular Filters", CFP '00: Proceedings of the Tenth Conference on Computers, Freedom and Privacy: Challenging the Assumptions, Apr. 2000, pp. 287-294.*

(Continued)

*Primary Examiner*—Laurie Ries
(74) *Attorney, Agent, or Firm*—McDermott Will & Emery LLP (57) ABSTRACT

A process of managing Internet pornography based on detection of the phrase "18 U.S.C. 2257 Record-Keeping Requirements Compliance Statement" or a discernable variation. The top level domain "xxx" may instead or in addition be examined.

21 Claims, 10 Drawing Sheets

U.S. PATENT DOCUMENTS

2005/0198319 A1* 9/2005 Chan et al. .................. 709/228
2005/0262063 A1* 11/2005 Conboy et al. ................. 707/3
2006/0036525 A1* 2/2006 Ramos et al. ................. 705/35
2006/0282771 A1* 12/2006 Vinci ......................... 715/530

OTHER PUBLICATIONS

Sakkis, George, "Learning How to Tell Ham From Spam", Crossroads, vol. 11, Issue 2, Dec. 2004, pp. 1-11.*

Chandrinos, KV, et al, "Automatic Web Rating: Filtering Obscene Content on the Web", Lecture Notes in Computer Science, Springer Berlin/Heidelberg, ISBN: 978-3-540-41023-2, Jan. 1, 2000, pp. 403-406.*

Zittrain, J. Internet Points of Control. Research Publication No. 2003-01, The Berkman Center for Internet & Society at Harvard Law School, located at http://cyber.law.harvard.edu/home/uploads/202/2003-01.pdf Zittrain Mar. 2003.

http://66.102.7.104/search?q=cache:qCRF40-k vgJ:usmirror.dansguardian.org/downloads/2/Old/2.4x/Solaris/DansGuardian.2.4.6-3.solaris9.sparc.gz+19+U.S.C.+2257+text+string+blockingUhl=en&client=firefox-a/. Retrieved Feb. 6, 2005.

* cited by examiner

| |
|---|
| 18 U.S.C. §2257 Record-Keeping Requirements Compliance Statement |
| 18 U.S.C. Section 2257 Record-Keeping Requirements Compliance Statement |
| Eighteen U.S.C. 2257 Record-Keeping Requirements Compliance Statement |
| 18 USC 2257 Record-Keeping Requirements Compliance Statement |
| Record-Keeping Requirements Compliance Statement (18 U.S.C. 2257) |
| 18 U.S.C. 2257 Record Keeping Requirements Compliance Statement |
| 18 U.S.C. 2257 Record-Keeping Requirements Compliance St'nt |
| 18 U.S.C. §2257 |
| 18 U.S.C. Section 2257 |
| Record-Keeping Requirements Compliance Statement |
| Compliance Statement |
| Record-Keeping Requirements |
| Requirements Compliance Statement |
| Section 2257 Compliance Statement |
| Section 2257 |

Fig. 4

| |
|---|
| 18 U.S.C. Section 2287 Record-Keeping Requirements Compliance Statement |
| 18 U.S.C. 2257 Recrod-Keeping Requirements Compliance Statement |
| 18 U.S.C. 2257 RecordKeeping Requrements Compliance Statement |
| 18 U.S.. 2257 Record-Keeping Requirements Compliance Statement |
| 18 U.S.C. 2257 Record-Keep Requirements Compliance Statement |
| 18 U.S.C. Section 22257 Record-Keeping Requirements Compliance Statement |
| 18 U.S.C. Sec. 2287 |
| Recrod-Keeping Requirements Compliance Statement |
| RecordKeeping Requrements Compliance Statement |
| 18 U.S.. 2257 |
| Record-Keep Requirements Compliance Statement |
| Eightn U.S.C. Section 2257 |
| Record-Keeping Requirement Compliance Statement |
| 18 U.S. 2257 |
| RecordKeeping Requirements Compliance Statement |
| 18 U.C. 2257 |
| Complance Statement |
| 28 U.S.C. Section 2257 Record-Keeping Requirements Compliance Statement |

Fig. 5

| Viewer Settings ||
|---|---|
| Name | Setting |
| John Smith | Block All |
| Jane Doe | Send Warning First |
| Jack Jones | Send Page and Warning |
| Wanda Brown | Require Password |
| Eva Gardner | Block on Weekdays |
| Henry Winkler | Block Between 7 AM and 8 PM |
| Jackson White | Require Login |
| Jerry Maldy | Block Gay Only |
| Arthur Link | Block None |

MANAGING INTERNET PORNOGRAPHY EFFECTIVELY

CROSS-REFERENCE TO RELATED APPLICATIONS

This application is based upon and claims priority to U.S. Provisional Application Ser. No. 60/686,928, entitled "Method and System for Effectively Blocking Pornographic Materials on the Internet," filed Jun. 2, 2005. The content of this provisional application is incorporated herein by reference.

BACKGROUND

1. Field

This application relates to filtering technologies, the Internet and to pornography.

2. Description of Related Art

Pornographic and non-pornographic content are often communicated over modern day communication systems, such as the World Wide Web.

Many users of these systems want to distinguish between the pornographic content and the non-pornographic content in order to block the pornographic content and/or to control the manner in which it is delivered. Some users find the content to be offensive, psychologically harmful (e.g., to children), annoying, and/or inappropriate. Pornographic content is also often associated with undesirable SPAM, pop-ups, pop-unders, mouse traps, and browser hijacking.

It is often difficult to accurately distinguish between pornographic and non-pornographic content. Testing for the presence of certain words, for example, has often resulted in errors, as almost every word may be used in both pornographic and non-pornographic contexts.

Techniques for distinguishing between pornographic and non-pornographic content are also sometimes time-consuming, sometimes requiring either the user or some other person to create and/or maintain a list of target words and/or URL addresses.

SUMMARY

A process of managing Internet pornography may include receiving a request for a first web page, retrieving the first web page, analyzing the first web page to determine whether it contains the phrase "18 U.S.C. 2257 Record-Keeping Requirements Compliance Statement" or a discernable variation, determining that the first web page does not contain the phrase "18 U.S.C. 2257 Record-Keeping Requirements Compliance Statement" or a discernable variation, allowing the first web page to be viewed by a viewer, receiving a request for a second web page, retrieving the second web page, analyzing the second web page to determine whether it contains the phrase "18 U.S.C. 2257 Record-Keeping Requirements Compliance Statement" or a discernable variation, determining that the second web page does contain the phrase "18 U.S.C. 2257 Record-Keeping Requirements Compliance Statement" or a discernable variation, and modifying the way in which the second web page is allowed to be viewed by the viewer.

The process may include checking a viewer setting that specifies the manner in which a web page that contains the phrase "18 U.S.C. 2257 Record-Keeping Requirements Compliance Statement" or a discernable variation should be viewed by a viewer, and modifying the way in which the second web page is allowed to be viewed by the viewer in the manner specified by the viewer setting.

The viewer setting may specify that no portion of a web page that contains the phrase "18 U.S.C. 2257 Record-Keeping Requirements Compliance Statement" or a discernable variation should be allowed to be viewed by the viewer.

The viewer setting may specify that no portion of a web page that contains the phrase "18 U.S.C. 2257 Record-Keeping Requirements Compliance Statement" or a discernable variation should be allowed to be viewed by the viewer if the request for the second web page was made within a pre-defined period. The pre-defined period may be a time period during each day. The pre-defined period may be a range of dates. The pre-defined period may be one or more days of each week.

The viewer setting may specify that no portion of a web page that contains the phrase "18 U.S.C. 2257 Record-Keeping Requirements Compliance Statement" or a discernable variation should be allowed to be viewed by the viewer unless the viewer enters a password.

The viewer setting may specify that no portion of a web page that contains the phrase "18 U.S.C. 2257 Record-Keeping Requirements Compliance Statement" or a discernable variation should be allowed to be viewed by the viewer if the viewer has not requested to see web pages that contain the phrase "18 U.S.C. 2257 Record-Keeping Requirements Compliance Statement" or a discernable variation before the request for the second web page is received.

The viewer setting may specify that the viewer should be sent a warning about the nature of the content of the web page and that the viewer must communicate that the viewer nevertheless wishes to see the web page before the viewer is allowed to see the second web page.

The viewer setting may require the viewer to enter a password as part of the process of communicating that the viewer nevertheless wishes to see the web page.

The viewer setting may specify that a warning about the content of the web page should be added to the web page before it is viewed by the viewer.

The receiving, retrieving, analyzing, determining and allowing steps may be performed by an Internet service provider. The viewer setting may be stored by the Internet service provider.

The viewer may set the viewer setting.

The viewer may establish an account with the Internet service provider and the viewer may set the viewer setting at the time the viewer establishes the account.

The receiving, retrieving, analyzing, determining and allowing steps may be performed by a computer being operated by the viewer. The computer may have a browser and the receiving, retrieving, analyzing, determining and allowing steps may be performed by the browser or by a software application that is separate from the browser.

The determining step may test for a misspelling of the phrase "18 U.S.C. 2257 Record-Keeping Requirements Compliance Statement."

The determining step may test for the phrase "18 U.S.C. 2257 Record-Keeping Requirements Compliance Statement" in a modified form.

The determining step may test for the phrase "18 U.S.C. 2257 Record-Keeping Requirements Compliance Statement" using pattern recognition technology.

Computer-readable media may contain computer-readable instructions that, when loaded in a computer system, cause the computer system to implement a process including receiving a request for a first web page, retrieving the first web page, analyzing the first web page to determine whether it contains the phrase "18 U.S.C. 2257 Record-Keeping Requirements Compliance Statement" or a discernable variation, determining that the first web page does not contain the phrase "18 U.S.C. 2257 Record-Keeping Requirements Compliance Statement" or a discernable variation, allowing the first web page to be viewed by a viewer, receiving a request for a second web page, retrieving the second web page, analyzing the second web page to determine whether it contains the phrase "18 U.S.C. 2257 Record-Keeping Requirements Compliance Statement" or a discernable variation, determining that the second web page does contain the phrase "18 U.S.C. 2257 Record-Keeping Requirements Compliance Statement" or a discernable variation, and modifying the way in which the second web page is allowed to be viewed by the viewer.

A process of managing Internet pornography may include receiving a first URL for a first web page that does not contain the top level domain name "xxx", analyzing the first URL to determine whether it contains the top level domain name "xxx", determining that first URL does not contain the top level domain name "xxx", allowing the first web page to be viewed by a viewer, receiving a second URL for a second web page that does contain the top level domain name "xxx", analyzing the second URL to determine whether it contains the top level domain name "xxx", determining that second URL does contain the top level domain name "xxx", and modifying the way in which the second web page is allowed to be viewed by the viewer.

These as well as still further features, objects, benefits, advantages, components and steps will now become clear upon a review of the Detailed Description of Illustrative Embodiments and the accompanying drawings.

DETAILED DESCRIPTION OF ILLUSTRATIVE EMBODIMENTS

Figure 1:
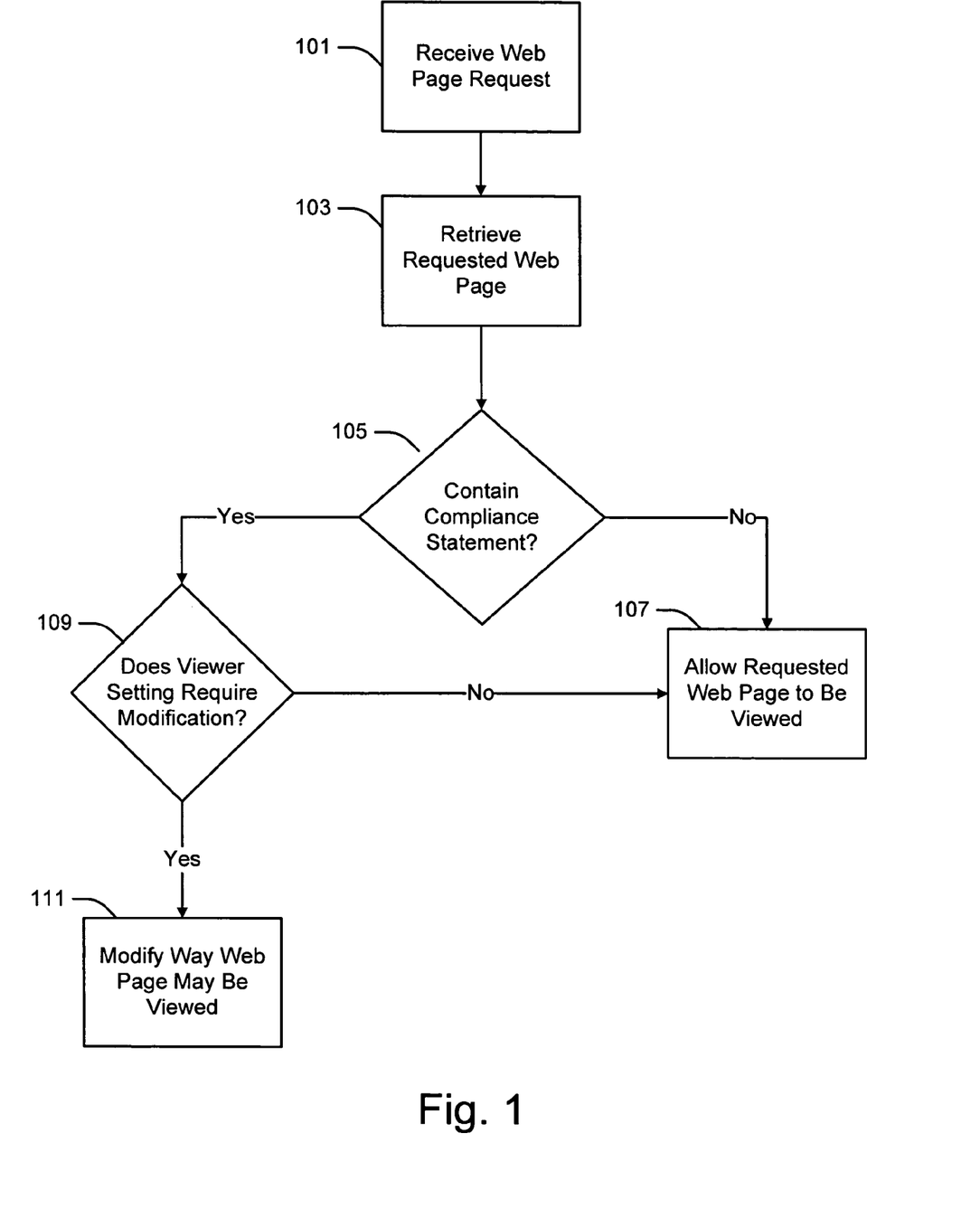
FIG. 1 is a flow diagram of a process of managing pornography.

FIG. 1 is a flow diagram of a process of managing pornography. As shown in FIG. 1, a request for a web page may be received, as reflected by a Receive Web Page Request step 101. The web page request may be in the form of a URL, an IP address, or in any other form. The URL or IP address may be directly entered into the address box of a browser, may be the result of clicking on a link on a web page that is being viewed, may be the result of a search query, or may be the result of any other type of process.

The requested web page may next be retrieved, as reflected by a Retrieve Requested Web Page step 103. This may be accomplished by any means, such as by sending a request for the web page into the Internet, such as through a dial-up, DSL, T1, fiber, cable, satellite or other type of connection.

Figure 2:
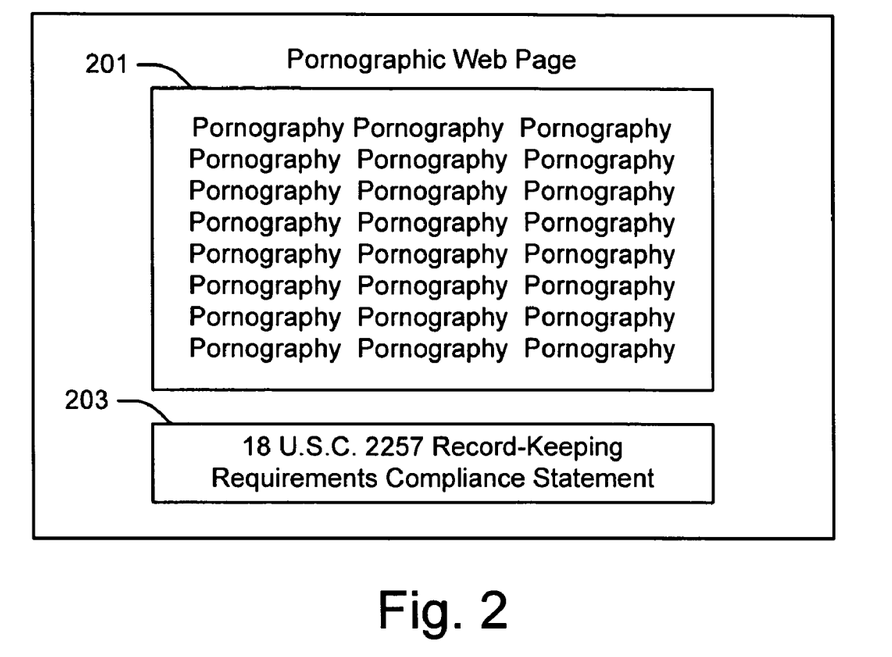
FIG. 2 illustrates a pornographic web page.

FIG. 2 illustrates a pornographic web page. Such a web page may be retrieved in response to the Retrieve Requested Web Page step 103. As illustrated in FIG. 2, the pornographic web page may include pornographic content 201.

The pornographic web page is also very likely to contain a compliance statement 203 due to a new federal regulation. Section 2257 of Title 18 of the United States Code imposes requirements on producers of any book, magazine, periodical, film, videotape, or other matter which contains one or more visual depictions of actual sexually explicit conduct that is associated with interstate or foreign commerce. Among the requirements is to maintain records concerning the age of the performers and to affix a notice to every copy of the material stating where the records are located in a form prescribed by the Attorney General.

Pursuant to this statute, the following regulation has been promulgated and went into effect on Jun. 23, 2005:

A computer site or service or Web Address containing a digitally- or computer-manipulated image, digital image, or picture, shall contain the required statement on its homepage, any known major entry points, or principal URL (including the principal URL of a subdomain), or in a separate window that opens upon the viewer's clicking a hypertext link that states, "18 U.S.C. 2257 Record-Keeping Requirements Compliance Statement."

Federal regulation therefore now requires pornographic websites to include a compliance statement 203 on websites that depict sexually explicit conduct. The presence or absence of such a statement on a web page, therefore, serves as a very effective indication of whether or not that web page contains pornographic content.

The next step of the process may be to test whether the web page contains the phrase "18 U.S.C. 2257 Record-Keeping Requirements Compliance Statement", as reflected by a Contain Compliance Statement decision step 105. The test may deem any discernable variation of the phrase to constitute a compliance statement. This may be done to take into account spelling errors, variations in the form of the statement, or otherwise.

Figure 4:
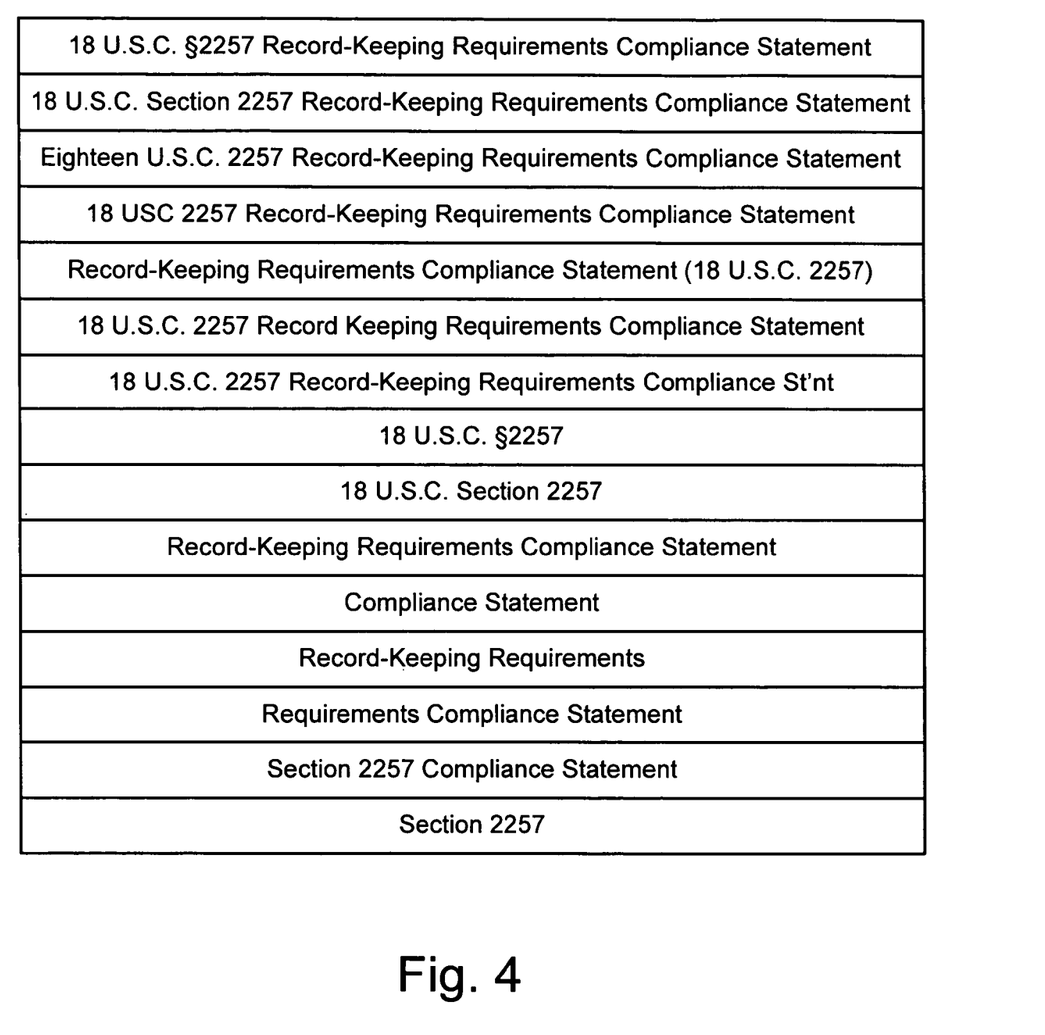
FIG. 4 illustrates discernable variations in the form of the statement required by 18 U.S.C. 2257.

FIG. 4 illustrates discernable variations in the form of the statement required by 18 U.S.C. 2257. These are examples of discernable variations in form that may be used and that may be interpreted by the process to constitute a compliance statement. Other discernable variations in form, of course, may also be used and may also be regarded by the process as a compliance statement.

Figure 5:
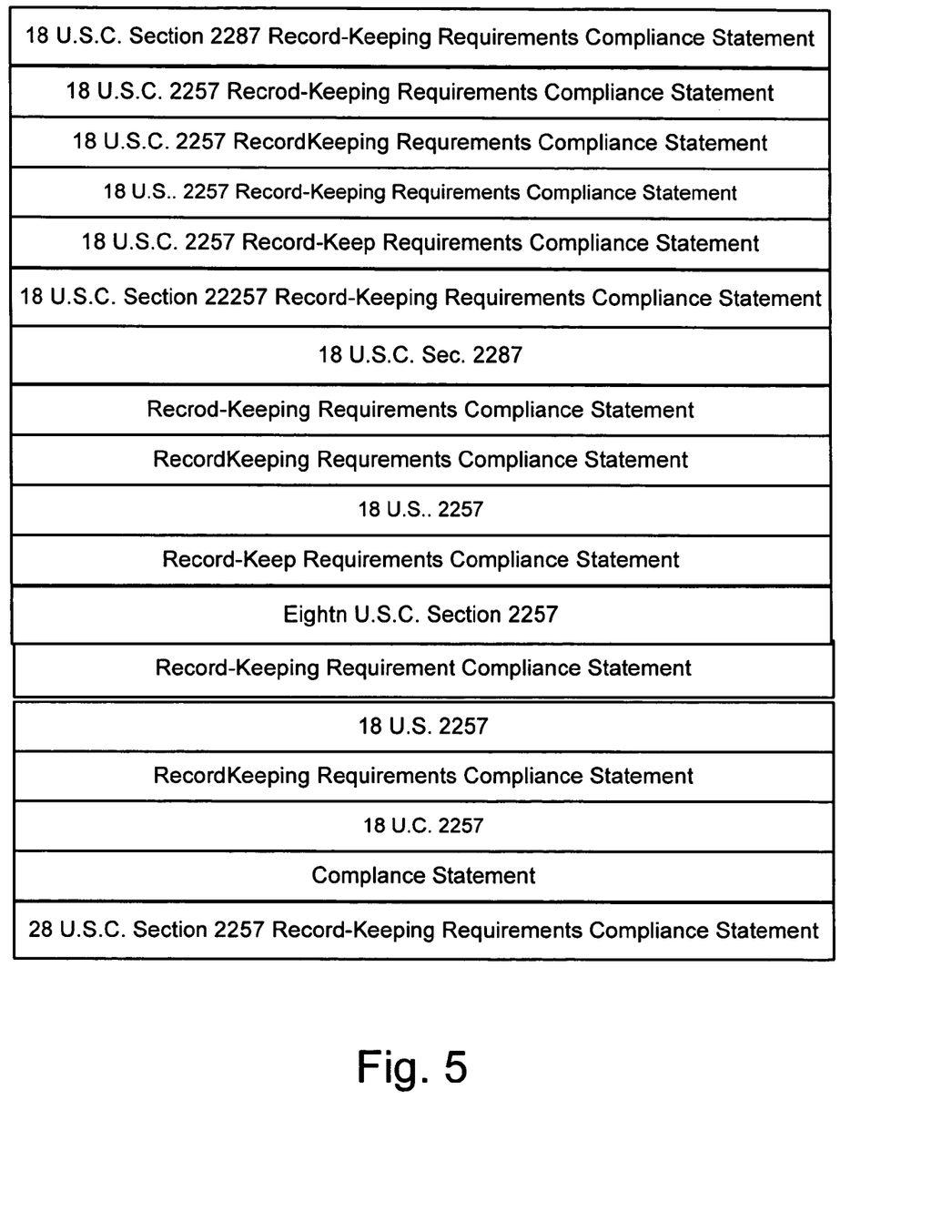
FIG. 5 illustrates discernable variations in spellings of the statement required by 18 U.S.C. 2257.

FIG. 5 illustrates discernable variations in spellings of the statement required by 18 U.S.C. 2257. These are examples of discernable variations in spelling that may be found and that may also be regarded by the process as a compliance statement. Other discernable variations in spellings, of course, may also be found and may also be regarded by the process as a compliance statement.

The Contain Compliance Statement decision step 105 may use any known pattern recognition technology to detect the presence of, not only the exact statement that is specified by the regulations, but discernable variations in the statement, such as the discernable variations in form shown in FIG. 4 and in spellings shown in FIG. 5.

If a compliance statement is determined to be missing from the retrieved web page, the viewer may be allowed to see the requested web page, as reflected by an Allow Requested Web Page to Be Viewed step 107. If a compliance statement is determined to be present on the requested web page, on the other hand, a determination may next be made as to whether the viewer has specified that such a web page should in some way be modified, as reflected by a Does View Setting Require Modification decision step 109. If the viewer has not requested any type of modification of a page containing actual sexually explicit conduct, the viewer may still be allowed to view the requested web page, as reflected by the process going to the Allow Requested Web Page to Be Viewed step 107.

On the other hand, if the viewer has requested some type of modification to a requested web page that contains sexually explicit conduct, the way in which that web page may be viewed may be modified, as reflected by a Modify Way Web Page May Be Viewed step 111.

Figure 3:
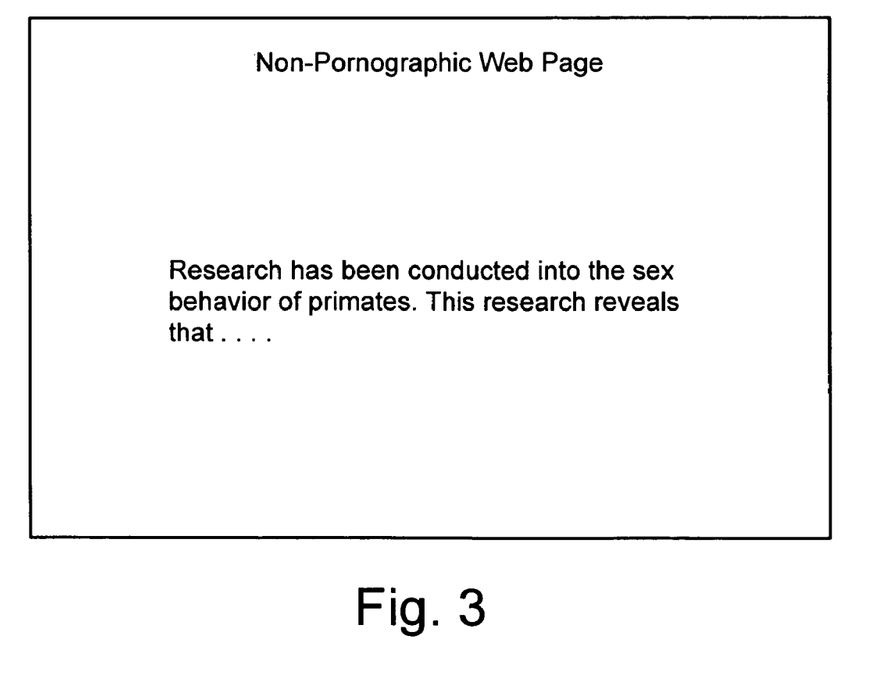
FIG. 3 illustrates a non-pornographic web page with language that could be mistaken for a pornographic web page

FIG. 3 illustrates a non-pornographic web page with language that could be mistaken for a pornographic web page. In FIG. 3, for example, the word "sex" appears in the text. In the past, pornographic filters have often removed pages of the type shown in FIG. 3, even though the page does not actually contain sexually explicit content. On the other hand, such a page does not contain a compliance statement. As a result, it would be correctly interpreted by the Contain Compliance Statement decision step 105 as not containing pornographic content.

There are almost an infinite number of ways in which a viewer may specify how it wishes to modify the way in which the viewer sees pornographic web pages. The ways in which viewers have decided to modify such pages may be stored as viewer settings in storage media.

Figure 6:
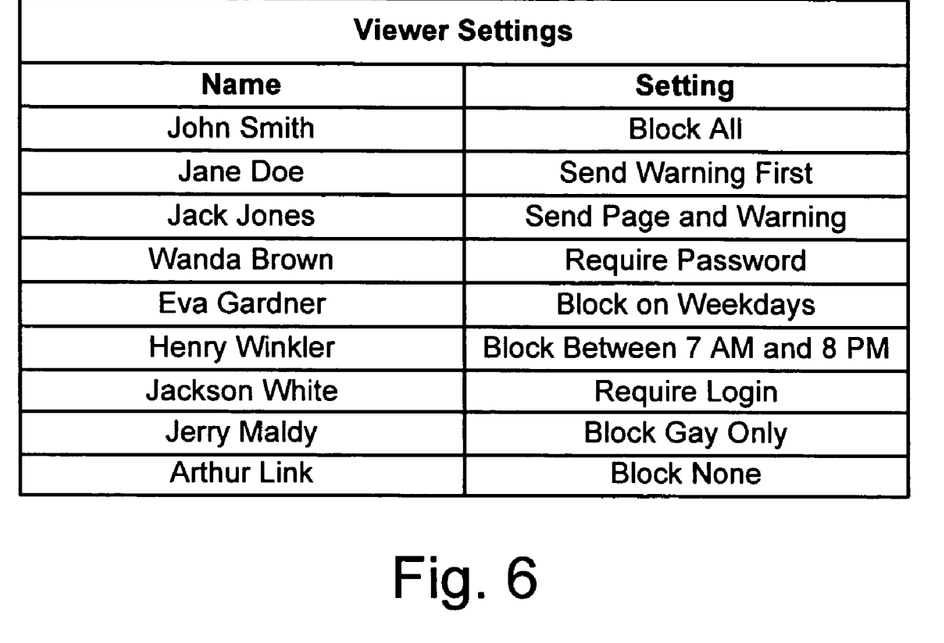
FIG. 6 illustrates various viewer settings.
Figure 7:
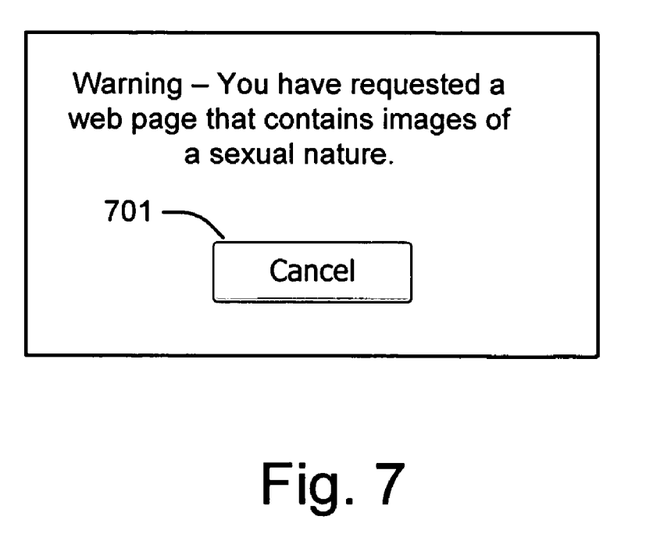
FIG. 7 illustrates a pornographic web page that has been modified by replacing it with a blocking warning.

FIG. 6 illustrates various viewer settings. Viewer John Smith, for example, is illustrated as having selected the viewer setting "Block All." This may be interpreted to mean that a detected pornographic page is to be modified by blocking its delivery to the viewer. To accomplish this, the system may be configured to replace the requested web page with a blocking warning and to deliver this blocking warning to the viewer. FIG. 7 illustrates a pornographic web page that has been modified by replacing it with a blocking warning. As reflected by FIG. 7, there is no option at this point to actually view the pornographic web page. The view must click a Cancel button 701, after which he will be able to continue surfing without seeing the requested pornographic web page.

Figure 8:
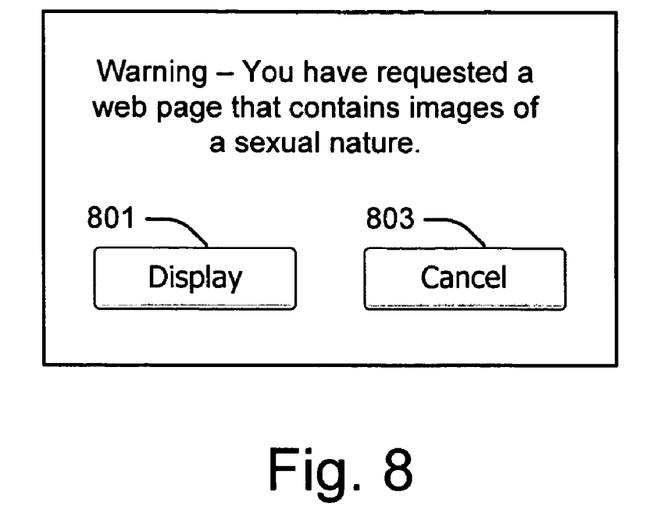
FIG. 8 illustrates a pornographic web page that has been modified by replacing it with a blocking warning that allows the web page to be displayed.

As shown in FIG. 6, viewer Jane Doe has selected the viewer setting "Send Warning First." This viewer setting may be included and configured to send a warning to the viewer that a pornographic web page has been detected, but to then allow the viewer, at the viewer's option, to nevertheless view this page. FIG. 8 illustrates a pornographic web page that has been replaced by a blocking warning that allows the web page to be displayed. The viewer may click a Display 801 button to nevertheless see the requested web page or a Cancel 803 button to continue without seeing the requested web page. A password may additionally be required to be entered before or after the selection of the Display 801 button as a further condition of allowing the pornographic web page to be displayed. The screen in FIG. 8 may be modified to accommodate the password, a separate password dialogue box may subsequently appear, or any other implementation approach may be used.

Figure 9:
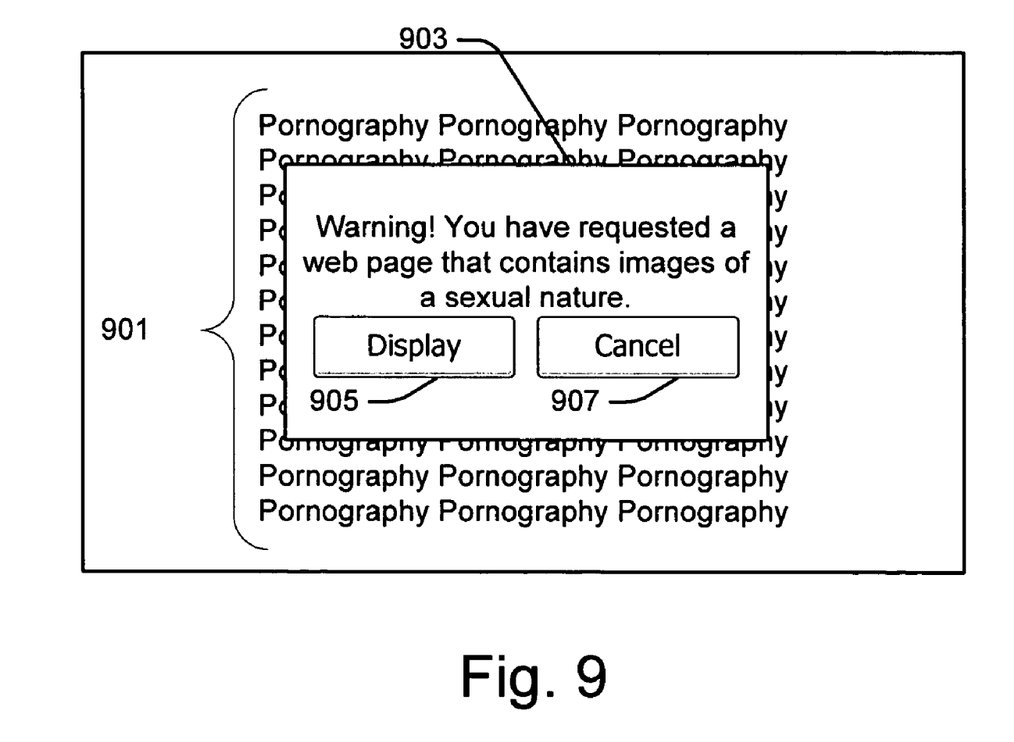
FIG. 9 illustrates a pornographic web page that has been modified by the addition of a blocking warning that allows the web page to be displayed.

As reflected in FIG. 6, viewer Jack Jones has selected the viewer setting "Send Page and Warning." This setting may be configured to cause the system to modify the requested web page by sending the web page with the addition of a blocking warning. FIG. 9 illustrates a pornographic web page that has been modified by adding a blocking warning to it that allows the web page to be displayed. As shown in FIG. 9, pornographic content 901 may partially appear. It may be dimmed or otherwise altered to reduce its visibility. A warning 903 may also appear on top of the web page. If a Display button 905 is selected, the warning 903 may disappear and the pornographic content 901 may appear completely and in its original form. If instead a Cancel button 907 is selected, the pornographic material 901 may disappear, along with the warning box 903. As with FIG. 8, a password may additionally be required in connection with the clicking of Display button 905.

As reflected in FIG. 6, viewer Wanda Brown may have selected the setting "Require Password." This setting may be configured to cause the system to require the viewer to enter a password in order to view any pornographic web page that has been detected. The password may be required in any sequence. For example, the password may be required only at the beginning of a surfing session. If it is entered, all detected pornographic pages may be delivered to the viewer without further interaction from the viewer. If it is not entered, on the other hand, all detected pornographic material may be blocked. When this occurs, an optional warning may be provided, such as the one shown in FIG. 7. A password may instead or in addition be required each time a pornographic web page is detected. An additional dialogue box or an additional field of information may be incorporated to implement this password requirement, such as in connection with the modified presentations shown in FIG. 8 or FIG. 9. Different security measures, such as a user name, certificate, or otherwise, may be implemented instead or in addition.

FIG. 6 illustrates viewer Eva Gardner having selected the viewer setting "Block on Weekdays." This illustrates another type of viewer setting that may be used, namely a setting that causes detected pornographic material to be blocked only on a particular day or set of days.

FIG. 6 illustrates viewer Henry Winkler having selected the viewer setting "Block Between 7 AM and 8 PM." This illustrates yet another type of viewer setting that may be used, namely one that causes detected pornographic pages to be blocked only during certain periods of the day.

FIG. 6 illustrates viewer Jackson White having selected the viewer setting "Require Login." This viewer setting may require a viewer to login at the beginning of a viewing session in order to view detected pornographic material, rather than or in addition to requiring the viewer to interact with the system each time a pornographic web page is detected. The login may include a requirement that the viewer enter a User ID and/or a password, implement another type of security procedure, and/or any combination of any of these processes.

FIG. 6 illustrates viewer Jerry Maldy having selected the viewer setting "Block Gay Only." The system may be configured to offer such a setting and to respond to it by only blocking detected pornographic web pages that appear to contain gay content. To determine this, the system may examine the content of each detected pornographic web page to determine whether it contains information indicative of gay content. Any other type of content-oriented viewer setting may also be offered in addition or instead.

FIG. 6 illustrates viewer Arthur Link having selected the viewer setting "Block None." The system may be configured to offer this setting and to respond to it by ignoring the presence of a compliance statement and by instead allowing pornographic web pages to be viewed without any type of modification.

All of the viewer settings reflected in FIG. 6, with the exception of the viewer setting "Block None," may be interpreted by the system as indicating a viewer setting that requires modification of the requested web page, so as to require the process flow to go from the decision step 109 to the step 111. The particular way in which the requested web page would be modified in the step 111 may depend upon the particular viewer setting that had been selected, examples of which are discussed above. The viewer setting "Block None" may instead be interpreted by the system as indicating a viewer setting that does not require modification of the requested web page, so as to require the process flow to go from the decision step 109 to the step 107.

Figure 10:
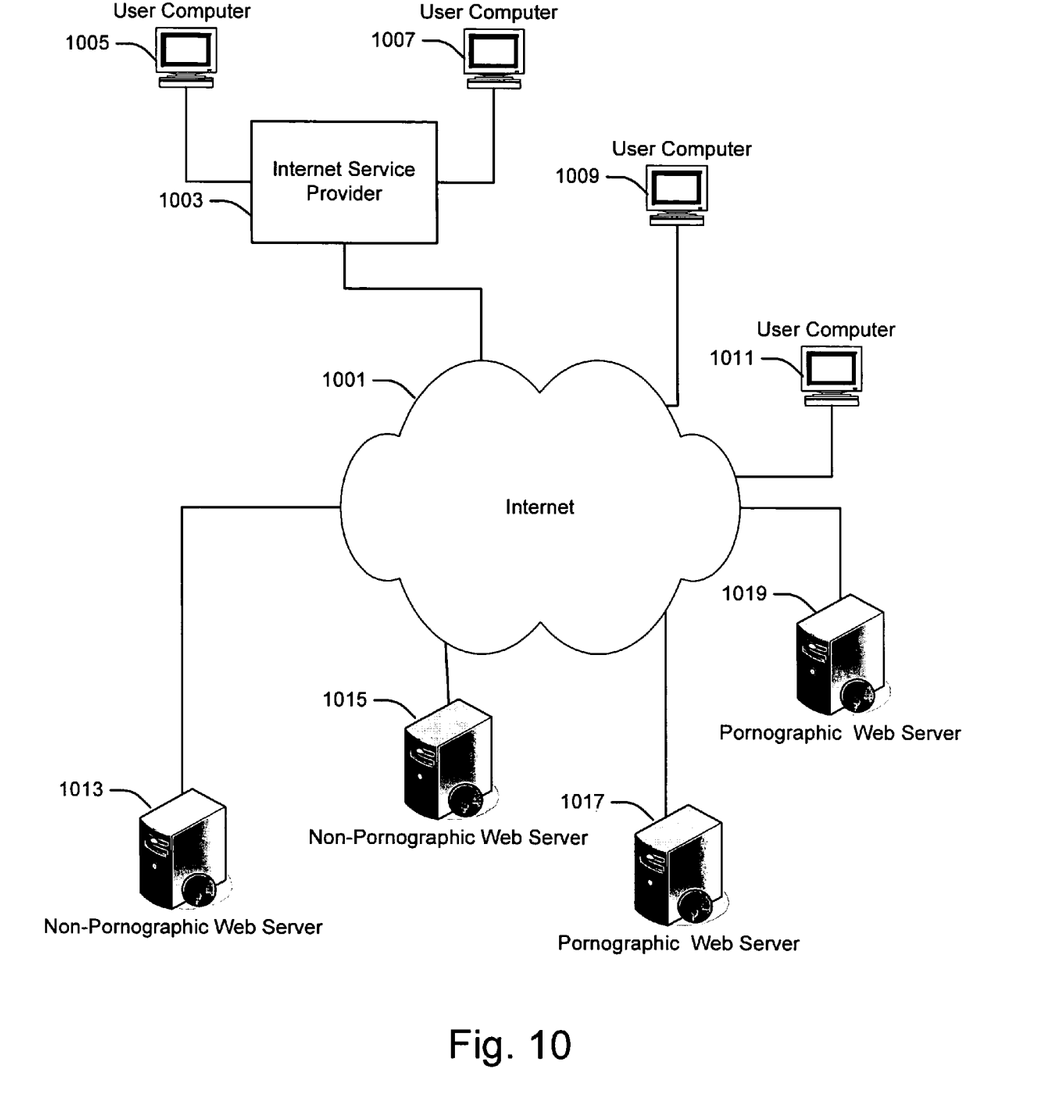
FIG. 10 illustrates a configuration of the World Wide Web with both pornographic and non-pornographic web servers.

FIG. 10 illustrates a configuration of the World Wide Web with both pornographic and non-pornographic web servers. The Internet 1001 may include communication links to one or more Internet service providers, such as an Internet service provider 1003. In turn, the Internet service providers, such as the Internet service provider 1003, may have communication links to one or more user computers, such as user computers 1005 and 1007. The Internet 1001 may have communication links directly with user computers, such as user computers 1009 and 1011. The Internet 1001 may contain communication links to one or more non-pornographic web servers, such as non-pornographic web servers 1013 and 1015. The Internet 1001 may contain communication links to one or more pornographic web servers, such as pornographic web servers 1017 and 1019. A single web server may serve both types of content.

Any type of communication link may be used for any of the communication links that have been discussed. Each communication link, for example, may include a dial-up, DSL, satellite, cable, fiber, T1, or any other type of connection or combination of connections.

The pornographic managing technology that has been discussed may be positioned at any point in a communication link, in any of the computers that have a communication link with the Internet, at only a single location, at multiple locations, or in any combination of these ways.

Figure 11:
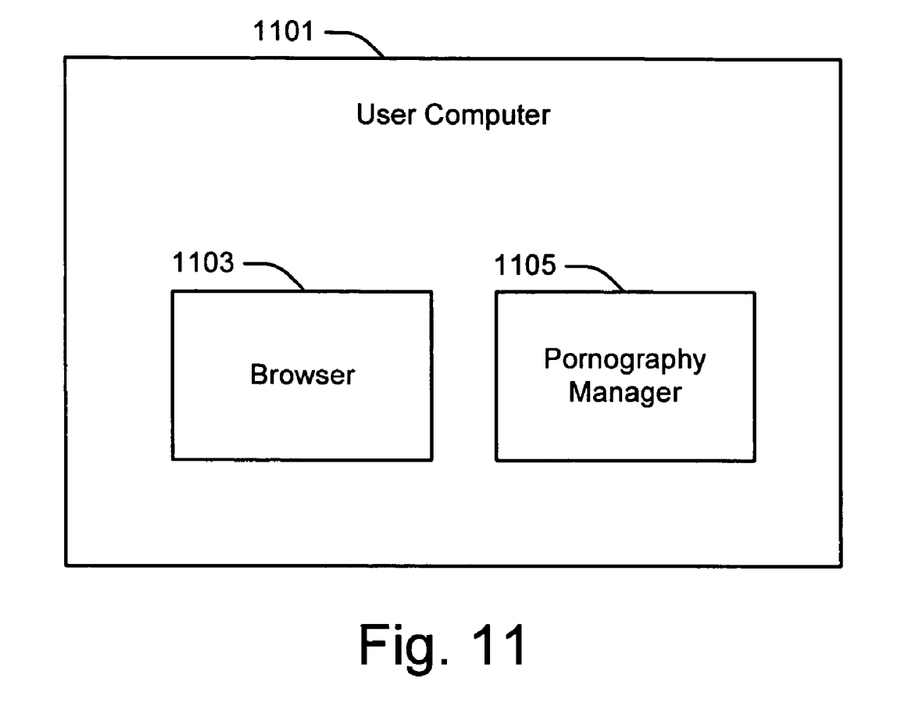
FIG. 11 illustrates a pornography manager as a separate component in a user computer.

FIG. 11 illustrates a pornography manager as a separate component of a user computer. As shown in FIG. 11, a user computer 1101 that has a communication link with the Internet may include a browser 1103 and a separate pornography manager 1105. The pornography manager 1105 may be configured to manage detected pornographic web pages in accordance with any of the processes discussed above. The pornography manager 1105 may be installed in the form of software at the time the browser 1103 is installed in the user computer 1101, or the pornography manager 1105 may be installed at any other time. The pornography manager 1105 may include a table of viewer settings, such as the viewer settings shown in FIG. 6. It may instead, or in addition, be configured to allow settings to be entered for only one viewer. It may instead, or in addition, not permit any viewer settings to be entered, in which case the pornography manager 1105 may be configured to modify a detected pornographic page in a pre-determined manner, such as in any of the manners discussed above in connection with FIG. 6.

Figure 12:
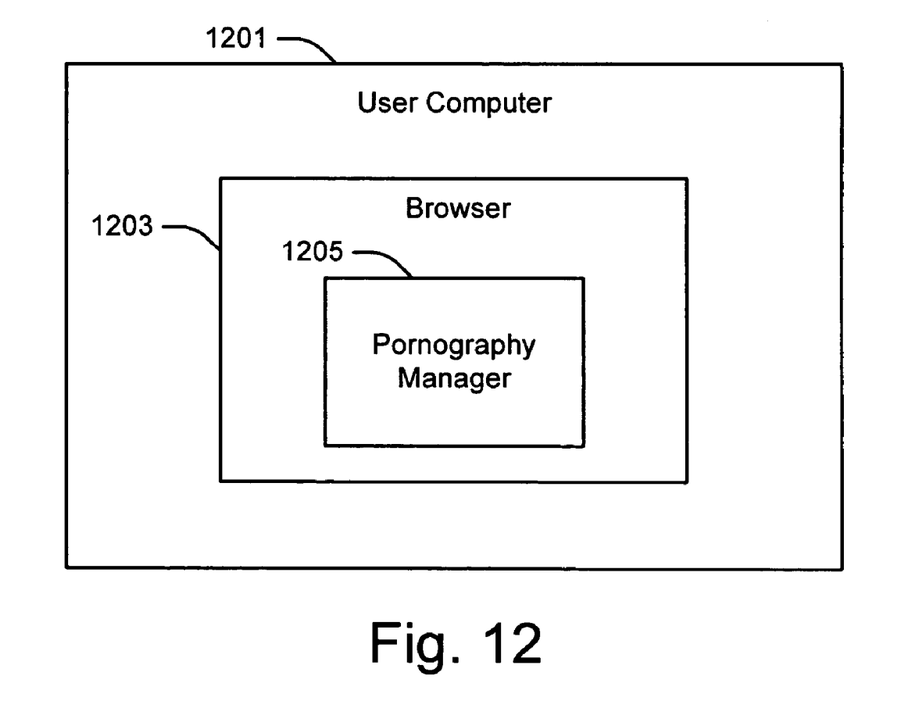
FIG. 12 illustrates a pornography manager as part of a browser component in a user computer.

FIG. 12 illustrates a pornography manager as a separate component in a user computer. As shown in FIG. 12, a user computer 1201 may include a browser 1203 that contains a pornography manager 1205. The pornography manager 1205 may be any of the types discussed above in connection with the pornography manager 1105 in FIG. 11. However, the pornography manager 1205 may instead be part of the browser 1203. It may, for example, be installed as a plug-in to the browser 1203 at the time that the browser 1203 is installed or at any other time.

Figure 13:
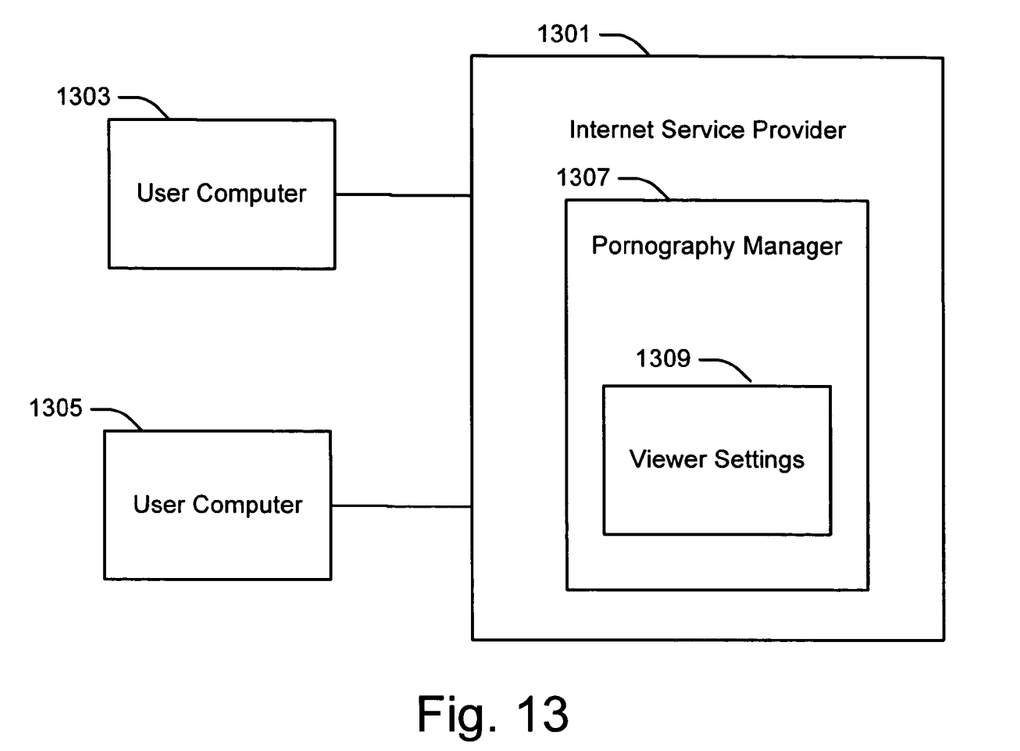
FIG. 13 illustrates a pornography manager as a component of an Internet service provider.

FIG. 13 illustrates a pornography manager as a component of an Internet service provider. As shown in FIG. 13, an Internet service provider 1301 may provide Internet service to a plurality of user computers, such as user computers 1303 and 1305. The Internet service provider 1301 may include within its system a pornography manager, such as pornography manager 1307. The pornography manager 1307 may be of any of the types discussed above in connection with the pornography block 1105 in FIG. 11. The pornography manager 1307 may include a table containing one or more viewer settings, such as viewer settings 1309. The viewer settings may include any or all of the settings discussed above in connection with FIG. 6, as well as any other types of viewer settings.

When the pornography manager is installed in the user computer, as illustrated in FIGS. 11 and 12, the implementation of the pornography managing process may take place in the user computer. When the pornography manager is installed at the Internet service provider, as shown in FIG. 13, the pornography managing process may take place within the computer(s) of the Internet service provider. The Internet service provider may include dialogue with each new user as part of the sign-up process during which each new user makes one of more viewer setting selection(s), such as one or more of the viewer setting selections discussed above in connection with FIG. 6. Alternatively, or in addition, each user may make these selections at any other time. The system may be configured to allow the user to make these selections in an on-line fashion, over the telephone, through any other means, or through any combination of means.

The Internet service provider may include the pornography managing service provided by the pornography manager 1307 as part of a premium service for which an additional fee may be charged. The Internet service provider may also or instead provide pornography managers for downloading and installation in user computers, such as in the configuration shown in FIG. 11 and/or FIG. 12.

Figure 14:
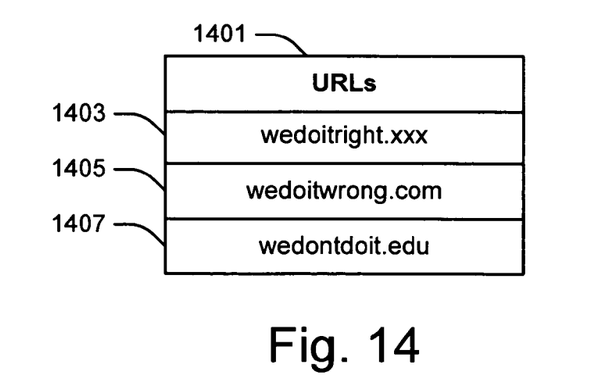
FIG. 14 is a table of URLs, including a URL with the top level domain "xxx".

FIG. 14 is a table of URLs, including a URL with the top-level domain name "xxx". As shown in FIG. 14, a table of URLs 1401 may include a URL 1403 with a top-level domain name "xxx". It may also include other URLs with other top-level domain names, such as URLs 1405 and 1407.

The top-level domain name "xxx" may, in fact, be a top-level domain name that is ultimately implemented on the Internet. If and when it is implemented, it may itself come to signify web pages that contain pornographic content. Conversely, the absence of the top-level domain name "xxx" may come to signify the absence of pornographic content from a web page.

Figure 15:
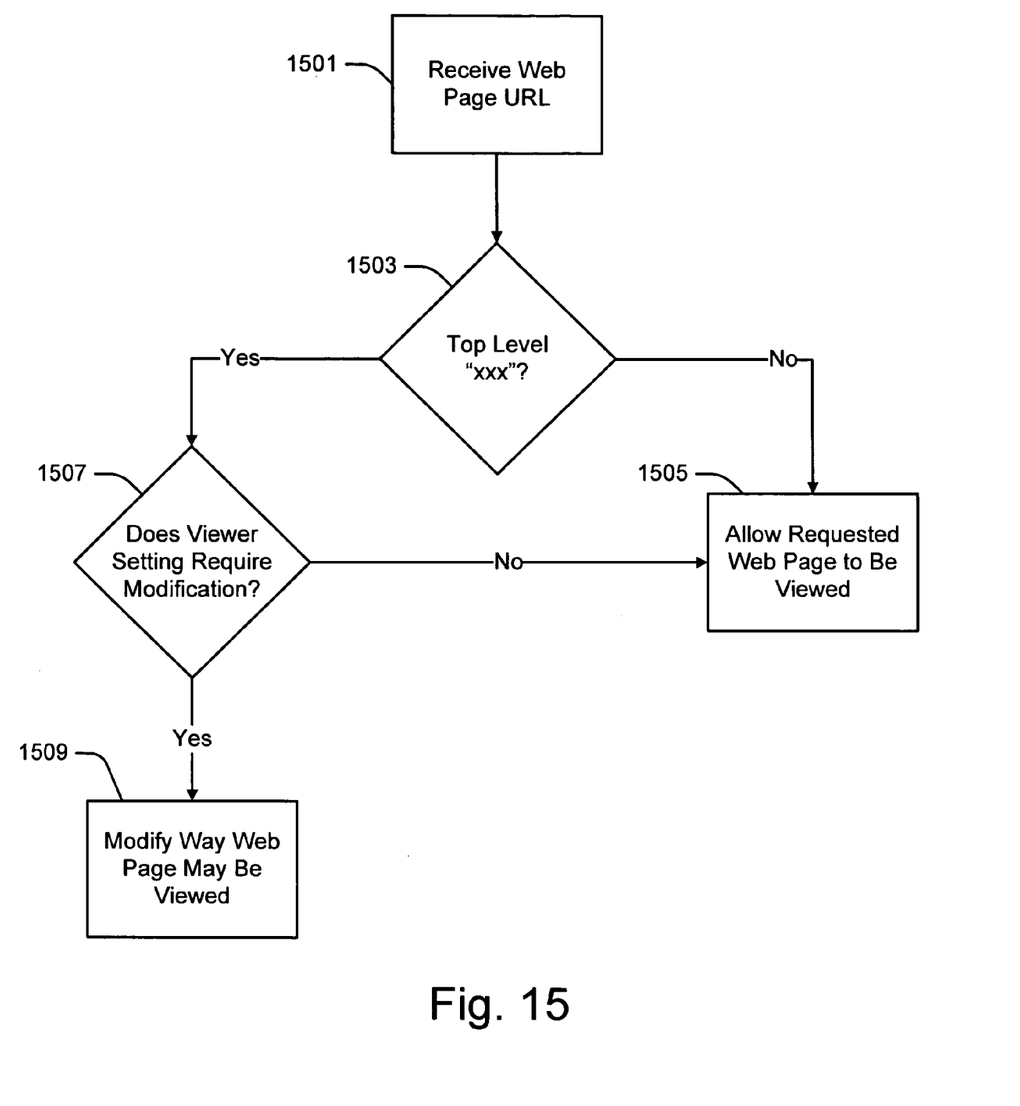
FIG. 15 is a flow diagram of an alternate process of managing pornography.

FIG. 15 is a flow diagram of an alternate process of managing pornography. It may take advantage of the potential new top-level domain name of "xxx". As shown in FIG. 15, a web page URL may be received, as reflected by a Receive Web Page URL step 1501. A determination may next be made as to whether this received URL contains the top-level domain name "xxx", as reflected by a Top Level "xxx" decision step 1503. If it does not, the viewer may be allowed to view the requested web page, as reflected by an Allow Requested Web Page to Be Viewed step 1505. If the top-level domain name is "xxx", the system may next determine whether a viewer setting requires modification of this requested web page, as reflected by a Does Viewer Setting Require Modification decision step 1507. If the viewer setting does not require modification, the requested web page may be viewed, as reflected by the Allow Requested Web Page to Be Viewed step 1505. If the viewer setting does require modification of the requested web page, the requested web page may be modified in the manner specified by the viewer setting, as reflected by a Modify Way Web Page May Be Viewed step 1509. Steps 1505, 1507 and 1509 may be implemented in any way, including in any of the ways discussed above in connection with corresponding steps 107, 109 and 111 in FIG. 1 and the associated examples provided in connection with FIG. 6 through FIG. 13.

The process illustrated in FIG. 15 may examine of the content of each requested web page as part of the process of determining whether the web page contains pornographic content. A weighting algorithm may be utilized in connection with this content examination as part of the process of making this decision. The question of whether the requested web page should be modified may be governed by the weight that is determined.

This content examination step may be performed in connection with web pages that have the top-level domain name "xxx", that do not have the top-level domain name "xxx", or in connection with both.

One or more forms of the managing internet pornography technology that has now been discussed may be used in connection with other forms of communication, such as e-mail, ftp and/or news groups.

The processes that have been described may be implemented by one or more computer systems using hardware, software or a combination of both.

The components, steps, features, objects, benefits and advantages that have been discussed are merely illustrative. None of them or the discussions relating to them are intended to limit the scope of protection in any way. Numerous other embodiments are also contemplated, including embodiments that have fewer, additional, and/or different components, steps, features, objects, benefits and advantages. The components and steps may also be arranged and ordered differently.

Nothing that has been stated or illustrated is intended to cause a dedication of any component, step, feature, object, benefit, advantage or equivalent to the public, regardless of whether or not it is recited in the claims.

In short, the scope of protection is limited solely by the claims that now follow. That scope is intended to be as broad as is reasonably consistent with the language that is used in the claims and to encompass all structural and functional equivalents.

The phrase "means for" or "step for" when used in a claim is intended to embrace the corresponding structure, material and acts that have been described and their equivalents. Conversely, the absence of either phrase is intended to mean that the claim is not limited in any way to such corresponding structures, materials or acts.

I claim:

1. A process of managing Internet pornography comprising:
   receiving a request for a first web page in a computer;
   retrieving the first web page in the computer;
   analyzing the first web page by a software pornography manager component in the computer which is configured to determine whether it contains a hypertext link that includes at least one of the following statements:
      "18" followed by "U.S.C." or "USC," followed by "2257" or "§2257" or "Section 2257"; or
      "Compliance Statement"; or
      "Record Keeping Requirements" or "Record-Keeping Requirements" (hereinafter "a compliance hypertext link");
   determining by the software pornography component in the computer that the first web page does not contain a compliance hypertext link;
   the computer allowing the first web page to be viewed by a viewer;
   receiving a request for a second web page in the computer;
   retrieving the second web page in the computer;
   analyzing the second web page by the software pornography component in the computer to determine whether it contains a compliance hypertext link;
   determining by the software pornography component in the computer that the second web page does contain a compliance hypertext link; and
   the computer modifying the way in which the second web page is allowed to be viewed by the viewer.

2. The process of claim 1 further including:
   checking a viewer setting that specifies the manner in which a web page that contains a compliance hypertext link should be viewed by a viewer; and
   modifying the way in which the second web page is allowed to be viewed by the viewer in the manner specified by the viewer setting.

3. The process of claim 2 wherein the viewer setting specifies that no portion of a web page that contains a compliance hypertext link should be allowed to be viewed by the viewer.

4. The process of claim 2 wherein the viewer setting specifies that no portion of a web page that contains a compliance hypertext link should be allowed to be viewed by the viewer if the request for the second web page was made within a pre-defined period.

5. The process of claim 4 wherein the pre-defined period is a time period during each day.

6. The process of claim 4 wherein the pre-defined period is a range of dates.

7. The process of claim 4 wherein the pre-defined period is one or more days of each week.

8. The process of claim 2 wherein the viewer setting specifies that no portion of a web page that contains a compliance hypertext link should be allowed to be viewed by the viewer unless the viewer enters a password.

9. The process of claim 2 wherein the viewer setting specifies that no portion of a web page that contains a compliance hypertext link should be allowed to be viewed by the viewer if the viewer has not requested to see web pages that contain a compliance hypertext link before the request for the second web page is received.

10. The process of claim 2 wherein the viewer setting specifies that the viewer should be sent a warning about the nature of the content of the web page and that the viewer must communicate that the viewer nevertheless wishes to see the web page before the viewer is allowed to see the second web page.

11. The process of claim 10 wherein the viewer setting requires the viewer to enter a password as part of the process of communicating that the viewer nevertheless wishes to see the web page.

12. The process of claim 2 wherein the viewer setting specifies that a warning about the content of the web page should be added to the web page before it is viewed by the viewer.

13. The process of claim 2 wherein the receiving, retrieving, analyzing, determining and allowing steps are performed by an Internet service provider and wherein the viewer setting is stored by the Internet service provider.

14. The process of claim 13 further including the viewer setting the viewer setting.

15. The process of claim 14 further including the viewer establishing an account with the internet service provider and wherein the viewer sets the viewer setting at the time the viewer establishes the account.

16. The process of claim 15 wherein the computer has a browser and the receiving, retrieving, analyzing, determining and allowing steps are performed by the browser.

17. The process of claim 15 wherein the computer has a browser and the receiving, retrieving, analyzing, determining and allowing steps are performed by a software application that is separate from the browser.

18. The process of claim 1 wherein the receiving, retrieving, analyzing, determining and allowing steps are performed by an Internet service provider.

19. The process of claim 1 wherein the receiving, retrieving, analyzing, determining and allowing steps are performed by a computer being operated by the viewer.

20. The process of claim 1 wherein the determining step test for a misspelling within a compliance hypertext link.

21. The process of claim 1 wherein the determining step test for a compliance hypertext link using pattern recognition technology.

* * * * *